(12) United States Patent
Yang

(10) Patent No.: US 9,665,520 B2
(45) Date of Patent: May 30, 2017

(54) MOTHERBOARD AND COMPUTER CONTROL SYSTEM INCLUDING THE SAME

(71) Applicant: ScienBiziP Consulting (Shen Zhen)Co., Ltd., Shenzhen (CN)

(72) Inventor: Meng-Liang Yang, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 0 days.

(21) Appl. No.: 14/920,667

(22) Filed: Oct. 22, 2015

(65) Prior Publication Data
US 2017/0103034 A1 Apr. 13, 2017

(30) Foreign Application Priority Data
Oct. 9, 2015 (CN) .......................... 2015 1 0647515

(51) Int. Cl.
| | | |
|---|---|---|
| G06F 13/00 | (2006.01) | |
| G06F 13/40 | (2006.01) | |
| G06F 13/10 | (2006.01) | |
| G06F 13/20 | (2006.01) | |
| G06F 13/42 | (2006.01) | |
| G06F 1/26 | (2006.01) | |

(52) U.S. Cl.
CPC .......... G06F 13/4022 (2013.01); G06F 1/266 (2013.01); G06F 13/102 (2013.01); G06F 13/20 (2013.01); G06F 13/4027 (2013.01); G06F 13/4068 (2013.01); G06F 13/4282 (2013.01)

(58) Field of Classification Search
None
See application file for complete search history.

(56) References Cited

U.S. PATENT DOCUMENTS

| | | | | | |
|---|---|---|---|---|---|
| 6,105,143 | A | * | 8/2000 | Kim | G06F 1/266 713/324 |
| 7,219,240 | B2 | * | 5/2007 | O | G06F 1/3218 345/211 |
| 7,222,250 | B2 | * | 5/2007 | Matsubara | G06F 1/3203 713/320 |
| 7,743,264 | B2 | * | 6/2010 | Brown | G06F 1/3203 345/211 |
| 8,006,107 | B2 | * | 8/2011 | Lin | G06F 1/266 710/100 |
| 8,275,999 | B2 | * | 9/2012 | Wu | G06F 1/26 713/300 |
| 2009/0300252 | A1 | * | 12/2009 | Liu | G06F 1/1601 710/302 |

* cited by examiner

Primary Examiner — Elias Mamo
(74) Attorney, Agent, or Firm — Steven Reiss

(57) ABSTRACT

The disclosure provides a motherboard including a first communication interface and a switch module. The first communication interface obtains a power signal from a second communication interface of a display, the switch module obtains the power signal, and the switch module controls a first power supply to power supply for the USB communication module. The disclosure also provides a computer control system including the motherboard. The motherboard and the computer control system control the computer to save energy via a display.

6 Claims, 3 Drawing Sheets

MOTHERBOARD AND COMPUTER CONTROL SYSTEM INCLUDING THE SAME

FIELD

The subject matter herein generally relates to a motherboard, and particularly to a computer control system including the motherboard.

BACKGROUND

A computer generally includes a host, a display, and inputting devices, such as keyboard and mouse. The inputting devices are coupled to the host or the monitor and supplied power by the host or the monitor. When the computer is not used, the monitor is shut down by pressing a power key on the monitor; however power is still supplied to the inputting devices.

BRIEF DESCRIPTION OF THE DRAWINGS

Implementations of the present technology will now be described, by way of example only, with reference to the attached figures.

DETAILED DESCRIPTION

Figure 1:
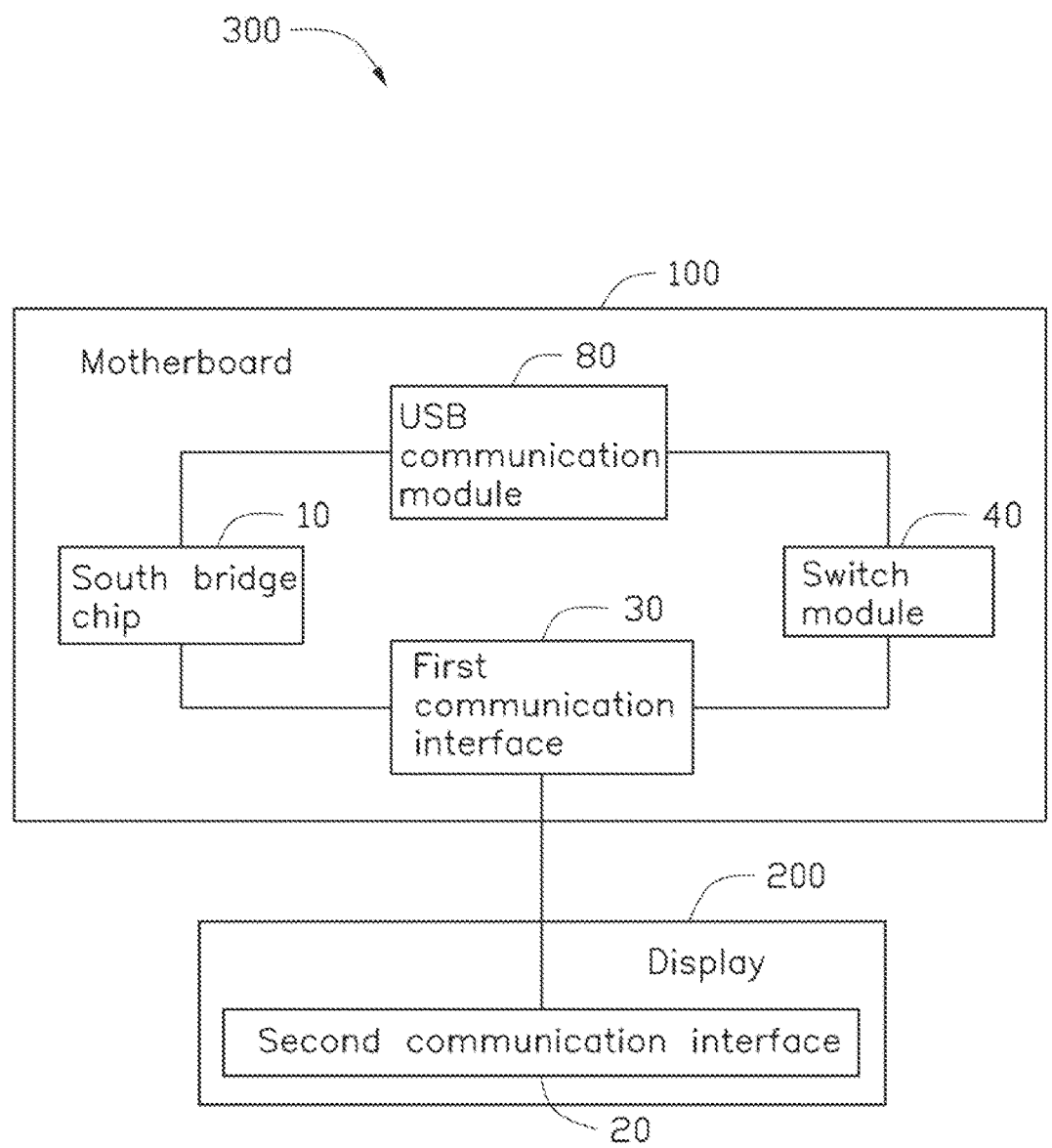
FIG. 1 is a block diagram of an embodiment of a computer control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrates details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series and the like.

FIG. 1 illustrates an embodiment of a computer control system 300. The computer control system 300 can comprise a motherboard 100 and a display 200. The motherboard 10 can comprise a south bridge chip 10, a first communication interface 30, a switch module 40, and a universal serial bus (USB) communication module 80. The first communication interface 30 is electrically coupled to a second communication interface 20 of the display 200.

In at least one embodiment, the first communication interface 30 obtains a power signal from the second communication interface 20, and transmits the power signal to the south bridge chip 10 and the switch module 40.

In at least one embodiment, the south bridge chip 10 obtains the power signal from the first communication interface 30. The south bridge chip 10 communicates with a peripheral input device 70 (such as keyboard and mouse) through the USB communication module 80.

In at least one embodiment, the switch module 40 obtains the power signal from the first communication interface 30, and controls power to the USB communication module 80 according to the power signal transmitted by the first communication interface 30.

In at least one embodiment, both the first communication interface 30 and the second communication interface 20 are a video graphics array (VGA) connector.

Figure 2:
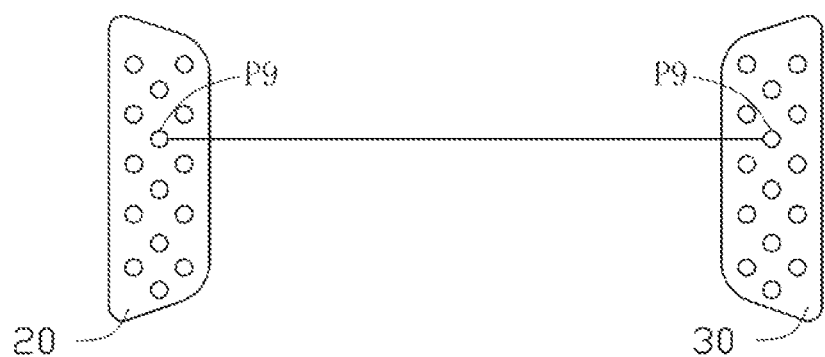
FIG. 2 is a diagrammatic view of a video graphics array (VGA) connector of a motherboard coupled to a VGA connector of a display of FIG. 1.

FIG. 2 illustrates that an idle pin P9 can comprise the VGA connector 30 and the VGA connector 20. The VGA connector 30 is electrically coupled to the VGA connector 20. The idle pin P9 of the VGA connector 30 is electrically coupled to the idle pin P9 of the VGA connector 20 to obtain the power signal from the idle pin P9 of first communication interface 20.

Figure 3:
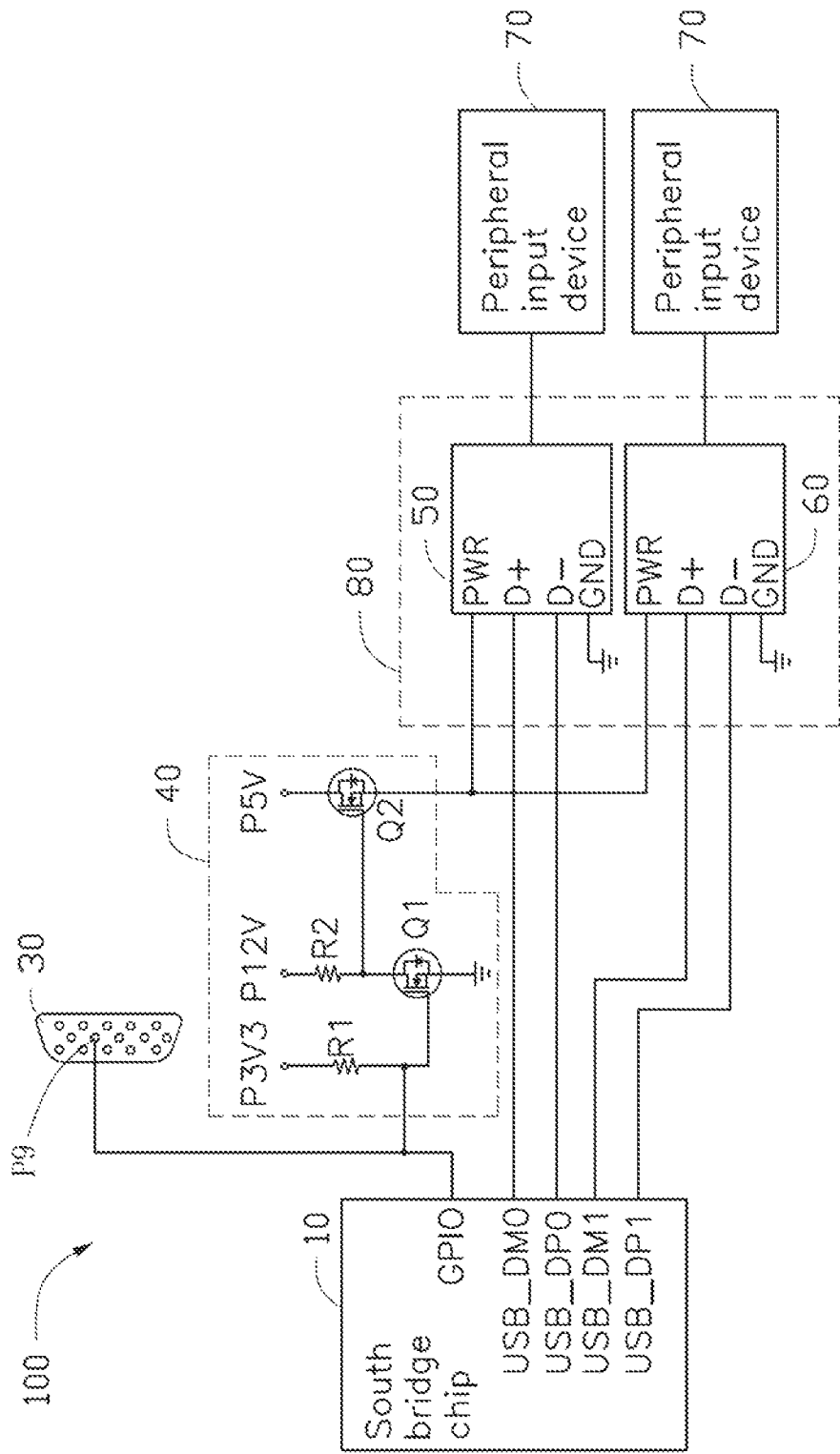
FIG. 3 is a circuit diagram of the motherboard of FIG. 1.

FIG. 3 illustrates that the south bridge chip 10 can comprise a general purpose input output (GIPO) terminal and four USB enable pins USB_DM0, USB_DP0, USB_DM1 and USB_DP1. The USB communication module 80 can comprise a first USB connector 50 and a second USB connector 60. Both the first USB connector 50 and the second USB connector 60 can comprise a first data pin D+, a second data pin D−, a power supply pin PWR, and a ground pin GND. Both the first USB connector 50 and the second USB connector 60 are coupled to the peripheral input device 70.

In at least one embodiment, the USB enable pin USB_DM0 of the south bridge chip 10 is electrically coupled to the first data pin D+ of the first USB connector 50. The USB enable pin USB_DP0 of the south bridge chip 10 is electrically coupled to the second data pin D− of the first USB connector 50. The USB enable pin USB_DM1 of the south bridge chip 10 is electrically coupled to the first data pin D+ of the second USB connector 60. The USB enable pin USB_DP1 of the south bridge chip 10 is electrically coupled to the second data pin D− of the second USB connector 60. The GPIO terminal of the south bridge chip 10 is electrically coupled to the idle pin P9 of the VGA connector 30. The ground pin GND of the first USB connector 50 and the second USB connector 60 are grounded. The power supply pin PWR of the first USB connector 50 and the second USB connector 60 are coupled to the switch module 40.

In at least one embodiment, the switch module 40 can comprise two field effect transistors (FETs) Q1 and Q2, and two resistors R1 and R2. A gate of the FET Q1 is coupled to the GPIO terminal of the south bridge chip 10, the gate of the FET Q1 is coupled to the idle pin P9 of the VGA connector 30, and the gate of the FET Q1 is coupled to a power supply P3V3 through the resistor R1. A source of the FET Q1 is grounded. A drain of the FET Q1 is coupled to a power supply P12V through the resistor R2, the drain of the FET Q1 is coupled to a gate of the FET Q2. A drain of the FET Q2 is coupled to a power supply P5V. A source of the FET Q2 is coupled to the power supply pin PWR of the first USB connector 50 and a second USB connector 60.

In at least one embodiment, when the button of the display 200 is pressed, the VGA connector 30 obtains the power signal from the idle pin P9 of the VGA connector 20, and the VGA connector 30 transmits the power signal to the south bridge chip 10 and the switch module 40.

When the user leaves the computer, and the button of the display 200 is pressed to turn off the display 200, the display 200 outputs a high level power signal to the idle pin P9 of the VGA connector 30 through the idle pin P9 of the VGA connector 20. The GPIO terminal of the south bridge chip 10 obtains the high level power signal from the VGA connector 30 and the south bridge chip 10 turns off the communication between the four USB enable pins of the south bridge chip 10 and the peripheral input device. At the meantime, the gate of the FET Q1 obtains the high level power signal from the idle pin P9 of the VGA connector 30, as the FET Q1 is turned on, and the FET Q2 is turned off. Thus, the power supply P5V does not power supply to the first USB connector 50 and the second USB connector 60, to turn off the power consumption of the peripheral input device.

When the user comes back to the computer, and the button of the display 20 is pressed to turn on the display 200, the display 200 outputs a low level power signal to the idle pin P9 of the VGA connector 30 through the idle pin P9 of the VGA connector 20. The GPIO terminal of the south bridge chip 10 obtains the low level power signal from the VGA connector 30 and the south bridge chip 10 turns on the communication between the four USB enable pins of the south bridge chip 10 and the peripheral input device. In the meantime, the gate of the FET Q1 obtains the low level power signal from the idle pin P9 of the VGA connector 30, as the FET Q1 is turned off, and the FET Q2 is turned on. Thus, the power supply P5V provides power supply to the first USB connector 50 and the second USB connector 60, to turn on the power to the peripheral input device.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A motherboard comprising:
   a universal serial bus (USB) communication module configured for coupling to a peripheral input device;
   a first communication interface obtaining a power signal from a display;
   a south bridge chip coupling to the first communication interface and configured for obtaining the power signal from the first communication interface, and the south bridge chip communicating with the peripheral input device through the USB communication module; and
   a switch module coupling to the first communication interface and configured for obtaining the power signal from the first communication interface;
   wherein when the power signal is power-on, the south bridge chip communicates with the peripheral input device, and the switch module controls a first power supply to supply power for the USB communication module; and
   wherein when power signal is power-off, the south bridge chip disconnects the communication from the peripheral input device, and the switch module switches off the power supply between the first power supply and the USB communication module;
   wherein the first communication interface comprises a first idle pin, the first communication interface is electrically coupled to a second communication interface of the display, the first idle pin of the first communication interface is electrically coupled to a second idle pin of the second communication interface;
   wherein the south bridge chip comprises a general purpose input output (GPIO) terminal and first to fourth USB enable pins;
   wherein the USB communication module comprises a first USB connector and a second USB connector, both the first USB connector and the second USB connector comprises a first data pin, a second data pin, a power supply pin, and a ground pin; and
   wherein the first USB enable pin of the south bridge chip is electrically coupled to the first data pin of the first USB connector, the second USB enable pin of the south bridge chip is electrically coupled to the second data pin of the first USB connector, the third USB enable pin of the south bridge chip is electrically coupled to the first data pin of the second USB connector, the fourth USB enable pin of the south bridge chip is electrically coupled to the second data pin of the second USB connector, the GPIO terminal of the south bridge chip is electrically coupled to the first idle pin of the first communication interface, the ground pin of the first USB connector and the second USB connector are grounded, and the power supply pin of the first USB connector and the second USB connector are coupled to the switch module.

2. The motherboard of claim 1, wherein the switch module comprises a first field effect transistor (FET) and a second FET, and a first resistor and a second resistor, a gate of the first FET is coupled to the GPIO terminal of the south bridge chip, the gate of the first FET is coupled to the first idle pin of the first communication interface, and the gate of the first FET is coupled to a second power supply through the first resistor, a source of the first FET is grounded, a drain of the first FET is coupled to a third power supply through the second resistor, a drain of the first FET is coupled to a gate of the second FET, a drain of the second FET is coupled to the first power supply, a source of the second FET is coupled to the power supply pin of the first USB connector and the second USB.

3. The motherboard of claim 2, wherein both the first communication interface and the second communication interface are a video graphics array (VGA) connector.

4. A computer control system, comprising:
   a display comprising a first communication interface to output a power signal; and
   a motherboard comprising:
   a universal serial bus (USB) communication module configured for coupling to a peripheral input device;
   a second communication interface obtaining the power signal from the display;
   a south bridge chip configured to the second communication interface and configured for obtaining the power signal from the second communication interface, and the south bridge chip communicating with the peripheral input device through the USB communication module; and
   a switch module coupling to the second communication interface and configured for obtaining the power signal from the second communication interface;
   wherein when the power signal is power-on, the south bridge chip communicates with the peripheral input device, and the switch module controls a first power supply to supply power for the USB communication module; and
   wherein when the power signal is power-off, the south bridge chip disconnects the communication from the peripheral input device, and the switch module switches off the power supply between the first power supply and the USB communication module;

wherein the first communication interface comprises a first idle pin, the first communication interface is electrically coupled to a second communication interface of the display, the first idle pin of the first communication interface is electrically coupled to a second idle pin of the second communication interface;

wherein the south bridge chip comprises a general purpose input output (GPIO) terminal and first to fourth USB enable pins;

wherein the USB communication module comprises a first USB connector and a second USB connector, both the first USB connector and the second USB connector comprises a first data pin, a second data pin, a power supply pin, and a ground pin; and wherein the first USB enable pin of the south bridge chip is electrically coupled to the first data pin of the first USB connector, the second USB enable pin of the south bridge chip is electrically coupled to the second data pin of the first USB connector, the third USB enable pin of the south bridge chip is electrically coupled to the first data pin of the second USB connector, the fourth USB enable pin of the south bridge chip is electrically coupled to the second data pin of the second USB connector, the GPIO terminal of the south bridge chip is electrically coupled to the first idle pin of the first communication interface, the ground pin of the first USB connector and the second USB connector are grounded, and the power supply pin of the first USB connector and the second USB connector are coupled to the switch module.

5. The computer control system of claim 4, wherein the switch module comprises a first field effect transistor (FET) and a second FET, and a first resistor and a second resistor, a gate of the first FET is coupled to the GPIO terminal of the south bridge chip, the gate of the first FET is coupled to the first idle pin of the second communication interface, and the gate of the first FET is coupled to a second power supply through the first resistor, a source of the first FET is grounded, a drain of the first FET is coupled to a third power supply through the second resistor, a drain of the first FET is coupled to a gate of the second FET, a drain of the second FET is coupled to the first power supply, a source of the second FET is coupled to the power supply pin of the first USB connector and the second USB.

6. The computer control system of claim 5, wherein both the first communication interface and the second communication interface are a video graphics array (VGA) connector.

* * * * *